United States Patent [19]
McFarland

[11] Patent Number: 5,464,271
[45] Date of Patent: Nov. 7, 1995

[54] BICYCLE SEATPOST WITH PIVOTAL SUSPENSION

[76] Inventor: Ryan J. McFarland, 120 Mt. Rushmore Rd., Custer, S. Dak. 57730

[21] Appl. No.: 222,641

[22] Filed: Apr. 4, 1994

[51] Int. Cl.⁶ ............................................ B62J 1/02
[52] U.S. Cl. .................... 297/209; 297/208; 280/220; 280/283; 267/131
[58] Field of Search .................. 297/195.1, 208, 297/209, 215.13, 215.15; 267/131, 132; 248/600; 280/220, 283, 287

[56] References Cited

U.S. PATENT DOCUMENTS

| 2,398,211 | 4/1946 | DuPont | 297/208 X |
|---|---|---|---|
| 3,481,628 | 12/1969 | Brilando et al. | 280/283 |
| 4,456,295 | 6/1984 | Francu | 297/211 |
| 4,736,983 | 4/1988 | Furbee | 297/209 |
| 5,044,648 | 9/1991 | Knapp | 280/283 |

FOREIGN PATENT DOCUMENTS

| 528069 | 2/1993 | European Pat. Off. | 280/220 |
|---|---|---|---|
| 542650 | 5/1993 | European Pat. Off. | 280/287 |
| 152186 | 9/1903 | Germany | 297/208 |
| 250368 | 9/1926 | Italy | 297/209 |
| 265885 | 2/1927 | United Kingdom | 297/209 |
| 474349 | 10/1937 | United Kingdom | 297/209 |

OTHER PUBLICATIONS

"Bike" magazine article Ten Underrated Products You Probably Don't Own But Maybe Should (in part) Jun. 1994, two pages 82 and 84.
"Bike" magazine article Softride Contour Mar. 1994, two pages 64 and 65.
"Mountain Bike Action" picture and caption describing Body Shock, Jan. 1995, one page 48.

Primary Examiner—Milton Nelson, Jr.
Attorney, Agent, or Firm—Gene R. Woodle

[57] ABSTRACT

A bicycle seatpost with an integrated pivotal suspension system. The seatpost has a lower piece and an upper piece joined by a pivot pin which allows the upper piece to rotate in a rearward and downward direction. A spring is interposed between the upper piece and the lower piece to provide resilient suspension.

4 Claims, 2 Drawing Sheets

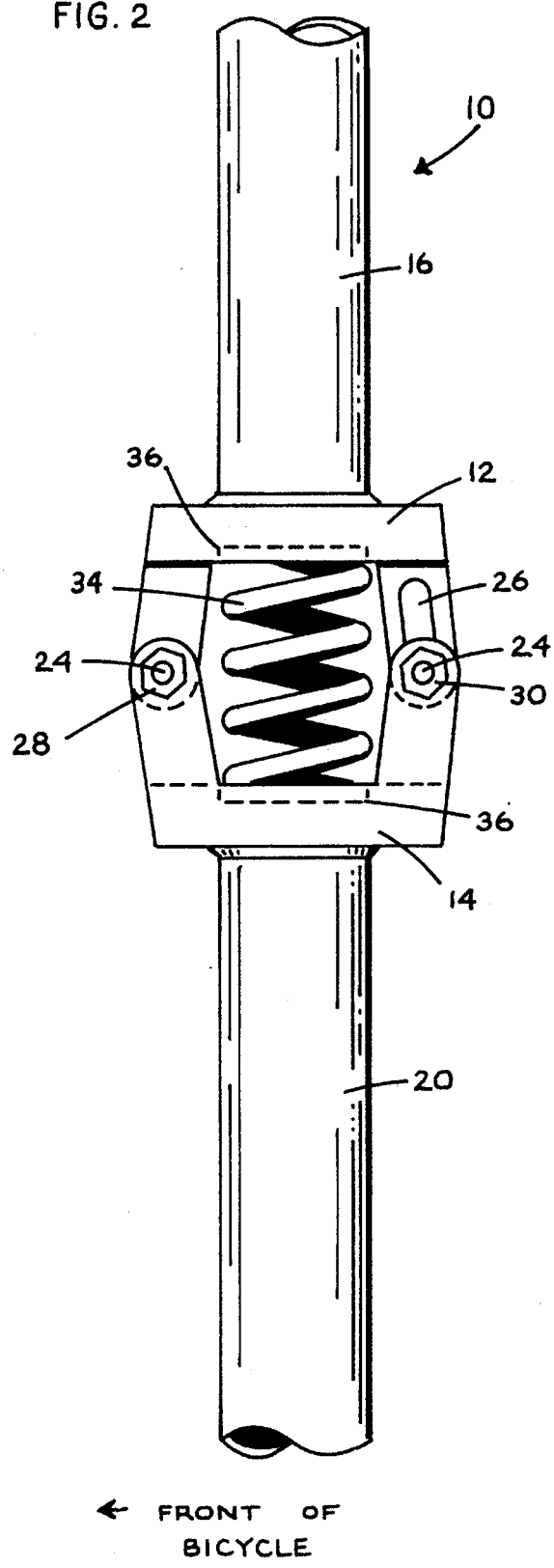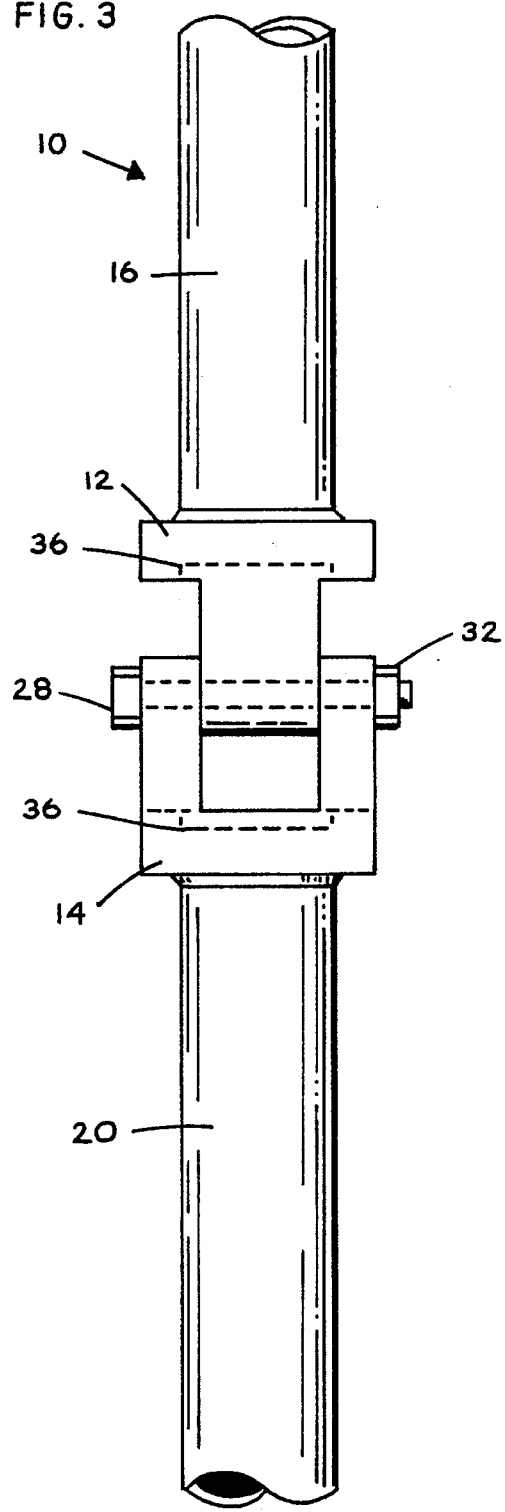

BICYCLE SEATPOST WITH PIVOTAL SUSPENSION

BACKGROUND OF INVENTION

Conventional bicycle frames are designed to be as light and as rigid as possible. They rely on this rigidity to efficiently transfer the rider's pedaling efforts to the rear tire. Good frame rigidity is also the foundation for a good handling bicycle. However, rigid frames have one major negative side effect, rider discomfort. Any bump encountered by the rear tire sends a shock force through the frame directly to the seat where it is felt by the rider.

There are two possible solutions to the problem of rider discomfort. The first solution involves the addition of a motorcycle-style suspension system to the bicycle frame. A second solution relies on the addition of a shock absorption device to the bicycle seatpost.

Motorcycle-style suspension systems have several problems. First, these systems are very heavy and thus require the rider to expend more energy to propel the bicycle. In addition, they reduce the frame's rigidity and thus its ability to efficiently transfer the rider's pedaling efforts to the rear fire. The added weight and loss of rigidity also reduce the bicycle's handling quality. Finally, custom-made suspension-frame bicycles are among the most expensive bicycles on the market. Considering these inherent problems, frames with motorcycle-style suspension systems are not a viable solution to the problem of rider discomfort.

A shock absorption device integrated into the seatpost of a bicycle offers increased rider comfort without the negative side effects of a motorcycle-style suspension system. Suspension seatposts are lightweight, inexpensive, and adaptable to nearly any existing bicycle. They advantageously allow use of conventional bicycles with lightweight, rigid, and efficient frames. And, when designed properly, they absorb bump forces transmitted from the rear tire, thus increasing rider comfort.

A search of prior art revealed two U.S. Patents relating to suspension seatposts for bicycles. The first seatpost, U.S. Pat. No. 4,456,295 to Nicholas Francu, shows a seat, suspended by numerous springs, that travels along a vertical path. The second seatpost, U.S. Pat. No. 4,736,983 to Raymond Furbee, shows a seat, suspended by a single spring, that travels along a downward, forward path determined by the angle of the bicycle frame's seat tube. Both of these seatposts are inherently flawed. Neither design situates the shock absorption device in line with the bump forces. As the rear tire of a bicycle encounters obstacles, it causes the bicycle frame to pivot around the axle of the front wheel. This pivoting action creates an upward, forward-moving bump force at the bicycle seat. Therefore, to avoid binding, a suspension seatpost must be designed with a shock absorption device that allows the seat to travel along a downward, rearward path.

SUMMARY OF INVENTION

This bicycle seatpost, with an integrated pivotal suspension system, successfully improves rider comfort without negative side effects. It is lightweight, simple, inexpensive, and adaptable to nearly any existing bicycle. This seatpost also allows use of a conventional, lightweight, rigid bicycle frame for efficiency and good handling. And, with its unique transversely arranged leading pivot, this suspension seatpost advantageously operates along a downward, rearward seat travel path as it absorbs the upward, forward-moving bump forces transmitted from the rear tire.

BRIEF DESCRIPTION OF DRAWINGS

FIG. 2 is an elevated lateral view of said seatpost.

FIG. 3 is an elevated frontal view of said seatpost.

DESCRIPTION OF PREFERRED EMBODIMENT

Figure 1:
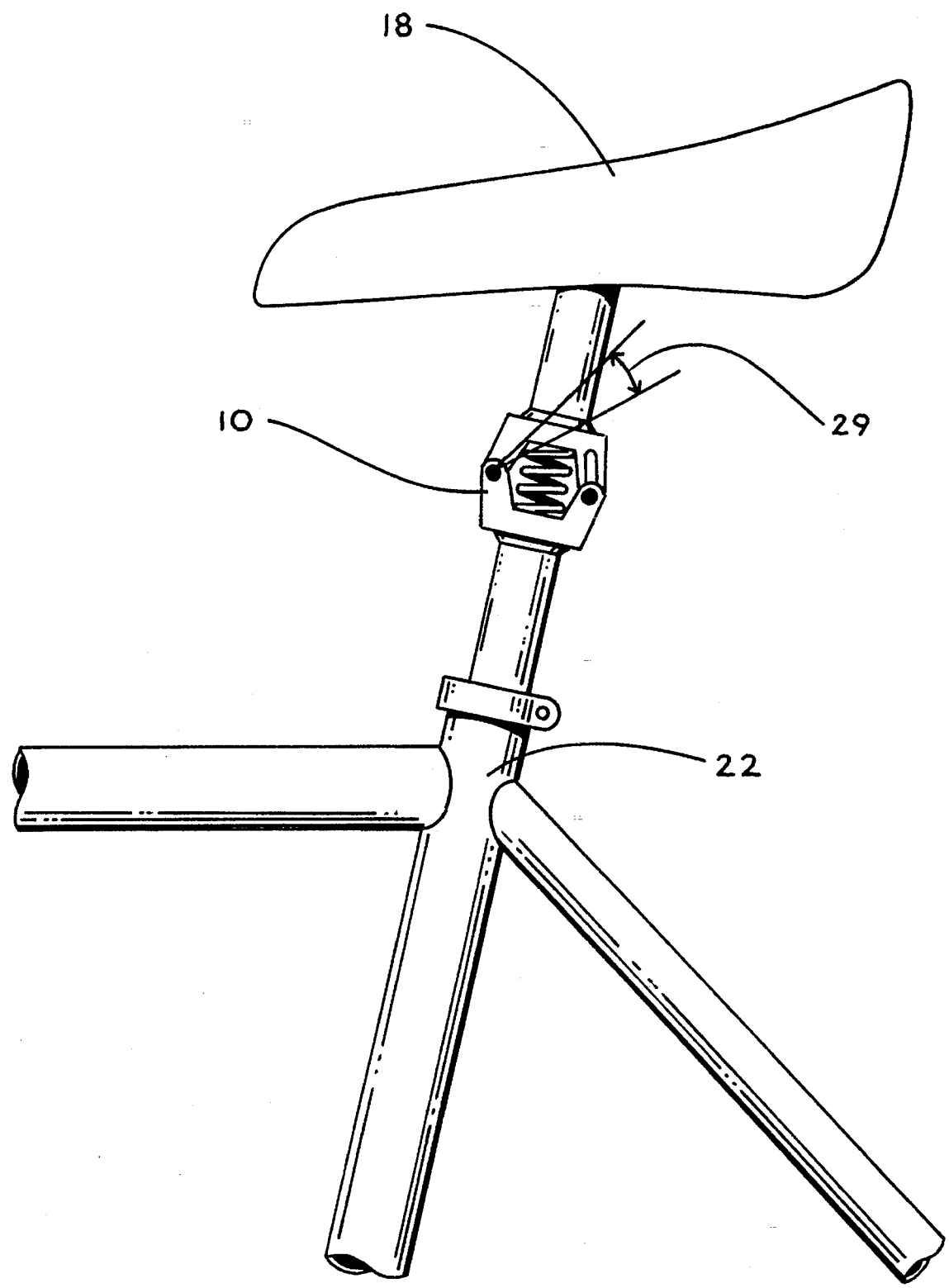
FIG. 1 is an elevated lateral view of the unique pivot-suspension bicycle seatpost in association with a bicycle frame and seat.

A bicycle seatpost 10 is shown which includes a first or upper piece 12 and a second or lower piece 14. Conventional means 16 for attaching a saddle-type bicycle seat 18 extends vertically from the upper surface of the first piece 12. A post 20 of the proper diameter to be inserted into a bicycle frame 22 extends vertically from the lower surface of the second piece 14. It is to be recognized that said diameter may vary depending on different bicycle frame designs. The upper piece 12 is a flat rectangular plate with downward extension at its fore and aft edges. A hole 24 is formed transversely through the leading downward extension. A slot 26 is formed transversely through the trailing downward extension. The lower piece 14 is a flat rectangular plate with upward extensions at all four corners. Holes 24 are formed transversely through both leading upward extensions and both trailing upward extensions. The upper and lower pieces 12 & 14 are designed to cooperatively interact such that all three leading edge transverse holes 24 align with each other and both trailing transverse holes 24 align with the trailing transverse slot 26. A first bolt 28 is placed through the leading edge holes 24. This bolt 28 acts as the unique transversely arranged leading pivot pin. A second bolt 30 is placed through the aligned trailing edge holes 24 and slot 26. This second bolt 30 acts as a travel-limiting pin. Locking nuts 32 are used to secure both bolts. It is to be understood that said bolts 28 & 30 and said locknuts 32 must not be overtightened as a minute amount of lateral clearance between interacting portions of upper and lower pieces 12 & 14 is necessary to accommodate pivoting motion. A cylindrical spring 34 is vertically disposed between the upper and lower pieces 12 & 14 and between the fore and aft bolts 28 & 30. This spring 34, being metallic or otherwise, is held in place by means of two indentations 36, one on the underside of the upper piece 12 and one on the top side of the lower piece 14. As this spring 34 compresses in response to bump forces transmitted from the rear tire, the bicycle seat moves along a downward, rearward travel path 29 as determined by the leading transverse pivot pin 28. While certain changes may be made in the details of this unique suspension seatpost, such changes will be within the spirit and scope of the present invention, as defined by the following claims.

I claim:

1. A bicycle seatpost with an integrated pivotal suspension system comprising:
   (1) a lower piece having a bottom end and a top end, the bottom end having means for mounting the lower piece to a seatpost acceptor on the frame of a bicycle, said lower piece having a forward face adapted to be nearest the front of the bicycle and a rearward face adapted to be away from the front of the bicycle, the top end of said lower piece having two aligned holes adapted to be perpendicular to the plane of the bicycle frame;
   (2) an upper piece having a bottom end and a top end, the top end adapted for attaching a bicycle seat, having a forward face adapted to be nearest the front of the bicycle and a rearward face adapted to be away from the front of the bicycle, the bottom end of the upper piece having a hole adapted to be perpendicular to the plane of the bicycle frame and alignable with said holes in said lower piece;

(3) a pivot pin inserted through said holes in said top end of said lower piece and said hole in said bottom end of said upper piece thereby joining said lower piece and said upper piece and allowing said upper piece to rotate about the pivot pin within the plane of the bicycle frame;

(4) a spring having its longitudinal axis extending vertically, the spring interposed between said upper piece and said lower piece, the top of said spring abutting said bottom end of said upper piece and the bottom of said spring abutting said top end of said lower piece;

(5) holding means to hold said spring in the vertical, interposed position; and (6) travel limiting means to limit the rotational travel of said upper piece such that said top end of said upper piece may not rotate forward beyond the point where said upper piece is aligned with said lower piece, and such that said top of said upper piece may rotate rearward;

whereby when the seatpost is mounted on a bicycle and a seat mounted on the seatpost and the bicycle hits a bump, a rider is cushioned from the effects of the bump by the spring and the seat is maintained in a stable riding position.

2. A bicycle seatpost with an integrated pivotal suspension system as set forth in claim 1 in which the holding means comprises an indentation in the bottom end of the upper piece the same shape and slightly larger than the top of the spring and into which said top of said spring is inserted, and an indentation in the top end of the lower piece the same shape and slightly larger than the bottom of said spring and into which said bottom of said spring is inserted.

3. A bicycle seatpost with an integrated pivotal suspension system comprising:

(1) a lower piece having a bottom end and a top end, the bottom end having means for mounting the lower piece to a seatpost acceptor on the frame of a bicycle, said top end of the lower piece having a forward face adapted to be nearest the front of the bicycle and a rearward face adapted to be away from the front of the bicycle, the forward face of the top end of said lower piece having two aligned holes adapted to be perpendicular to the plane of the bicycle frame, the rearward face of said top end of said lower piece having two aligned holes adapted to be perpendicular to the plane of the bicycle frame;

(2) an upper piece having a bottom end and a top end, the top end adapted for attaching a bicycle seat said bottom end of, the upper piece having a forward face adapted to be nearest the front of the bicycle and a rearward face adapted to be away from the front of the bicycle, the forward face of the bottom end having a hole adapted to be perpendicular to the plane of the bicycle frame and alignable with said holes in said forward face of said lower piece, the rearward face of said bottom end of said upper piece having a vertical slot adapted to be perpendicular to the plane of the bicycle frame and alignable with said holes in said rearward face of said lower piece;

(3) a pivot pin inserted through said holes in said forward face of said top end of said lower piece and said hole in said forward face of said bottom end of said upper piece joining said lower piece and said upper piece and allowing said upper piece to rotate about the pivot pin within the plane of the bicycle frame;

(4) a spring having its longitudinal axis extending vertically, the spring interposed between said upper piece and said lower piece, the top of said spring abutting said bottom end of said upper piece and the bottom of said spring abutting said top end of said lower piece;

(5) holding means to hold said spring in the vertical, interposed position; and (6) a travel limiting pin inserted through said holes in said rearward face of said lower piece and said slot in said rearward face of said bottom end of said upper piece such that forward rotational travel of said top end of said upper piece is limited to the point where said upper piece is aligned with said lower piece, and such that said top end of said upper piece may rotate rearward until the limit of said slot is reached;

whereby when the seatpost is mounted on a bicycle and a seat mounted on the seatpost and the bicycle hits a bump a rider is cushioned from the effects of the bump by the spring and the seat is maintained in a stable riding position.

4. A bicycle seatpost with an integrated pivotal suspension system as set forth in claim 3 in which the holding means comprises an indentation in the bottom end of the upper piece the same shape and slightly larger than the top of the spring and into which said top of said spring is inserted; and an indentation in the top end of the lower piece the same shape and slightly larger than the bottom of said spring and into which said bottom of said spring is inserted.

\* \* \* \* \*